United States Patent
O'Neill

(10) Patent No.: US 11,479,954 B2
(45) Date of Patent: Oct. 25, 2022

(54) SOLID WASTE INTERCEPTOR FOR A DRAIN

(71) Applicant: Environmental Products & Services Limited, Newry (GB)

(72) Inventor: James O'Neill, Newry (GB)

(73) Assignee: Environmental Products & Services Limited, Newry (GB)

( * ) Notice: Subject to any disclaimer, the term of this patent is extended or adjusted under 35 U.S.C. 154(b) by 342 days.

(21) Appl. No.: 16/644,386

(22) PCT Filed: Sep. 4, 2018

(86) PCT No.: PCT/EP2018/073777
§ 371 (c)(1),
(2) Date: Mar. 4, 2020

(87) PCT Pub. No.: WO2019/048436
PCT Pub. Date: Mar. 14, 2019

(65) Prior Publication Data
US 2021/0071399 A1    Mar. 11, 2021

(30) Foreign Application Priority Data
Sep. 7, 2017 (GB) .................................... 1714432

(51) Int. Cl.
*E03C 1/264*    (2006.01)
*C02F 1/40*     (2006.01)
(Continued)

(52) U.S. Cl.
CPC .............. *E03C 1/264* (2013.01); *B01D 29/23* (2013.01); *C02F 1/40* (2013.01); *E03F 5/14* (2013.01); *E03F 5/16* (2013.01)

(58) Field of Classification Search
CPC ........... E02B 1/26; E02B 1/264; B01D 23/02; B01D 23/20; B01D 29/23; B01D 29/35;
(Continued)

(56) References Cited

U.S. PATENT DOCUMENTS 1,903,623 A    4/1933    Howe
2,353,993 A    7/1944    Cavicchioli
(Continued)

FOREIGN PATENT DOCUMENTS

AU    2835997    1/1998
CA    2539804    9/2007
(Continued)

OTHER PUBLICATIONS

International Search Report and Written Opinion of the ISA from corresponding PCT Application No. PCT/EP2018/073777, dated Nov. 26, 2018.
(Continued)

*Primary Examiner* — Christopher Upton
(74) *Attorney, Agent, or Firm* — Gardner, Linn, Burkhart & Ondersma LLP

(57) ABSTRACT

A solid waste interceptor for a drain includes a tank for collecting waste water therein, the tank having a waste water inlet and a waste water outlet, a tray housing a strainer basket being slidably mounted within the tank, in the manner of a drawer, to be moved between a closed position in which the strainer basket receives waste water from the waste water inlet, and an open position in which the tray extends from the tank to provide access to the strainer basket to facilitate emptying of collected solid waste therefrom. The tray is provided with a drain outlet for delivering waste water passing through the strainer basket into a sump of the tank, and the drain outlet spigot is adapted to abut a front
(Continued)

wall of the tank when the tray is in its open position to delimit the open position of the tray.

12 Claims, 7 Drawing Sheets

(51) Int. Cl.
*E03F 5/16* (2006.01)
*B01D 29/23* (2006.01)
*E03F 5/14* (2006.01)

(58) Field of Classification Search
CPC ...... E03F 5/04; E03F 5/14; E03C 1/26; E03C 1/264
USPC .... 210/236, 455, 463, 482; 4/286, 290, 291, 4/629, 679
See application file for complete search history.

(56) References Cited

U.S. PATENT DOCUMENTS

| | | | |
|---|---|---|---|
| 5,069,781 A * | 12/1991 | Wilkes | E03F 5/041 4/290 |
| 5,397,464 A * | 3/1995 | Hannon | B01D 29/35 210/473 |
| 7,504,024 B1 * | 3/2009 | Batten | E03C 1/264 4/286 |
| 7,883,620 B2 * | 2/2011 | Owen | E03C 1/26 210/455 |
| 2007/0289058 A1 | 12/2007 | Luk | |

FOREIGN PATENT DOCUMENTS

| | | |
|---|---|---|
| CN | 201185878 | 1/2009 |
| CN | 102462213 | 5/2012 |
| CN | 203947542 | 11/2014 |
| DE | 202008014858 | 3/2009 |

OTHER PUBLICATIONS

UK Search Report of corresponding Application No. GB1714432.0, dated Dec. 11, 2017.

* cited by examiner

SOLID WASTE INTERCEPTOR FOR A DRAIN

CROSS REFERENCE TO RELATED APPLICATIONS

The present application is a § 371 national stage of International Application PCT/EP2018/073777, filed Sep. 4, 2018, which claims priority benefit of U.K. Pat. Application Ser. No. 1714432.0, filed Sep. 7, 2017, both of which are hereby incorporated herein by reference in their entireties.

FIELD OF THE INVENTION

This invention relates to a solid waste interceptor for a drain, and more especially to a solid waste interceptor for removing solid waste from waste water upstream of a grease trap.

BACKGROUND OF THE INVENTION

Waste water from catering facilities, food processing and washing facilities and commercial and domestic kitchens frequently contains large amounts of solid food waste and also grease in an emulsified state, as well as grease laden solids in suspension, typically in the form of foods wastes.

Aerobic mesophilic bacteria rapidly seek to degrade the food wastes entrained in waste water effluent from food service establishments typically. In the process dissolved oxygen is rapidly depleted turning conditions anaerobic and foul smelling.

Foul odours associated with grease traps are caused by organic matter such as food waste and dairy products being biologically decomposed in water having a temperature range of 30° C. to 50° C. creating ideal conditions for the rapid growth of indigenous mesophilic bacteria. The exhaustion of dissolved oxygen in aquatic watercourses leads to the death of obligately aerobic micro-organisms, invertebrates and fish. A further consequence is the development of anaerobic bacteria and associated foul smells. Foul smelling anaerobic conditions are characteristic of all grease traps or interceptors.

Biological Oxygen Demand (BOD) is a measure of the amount of dissolved oxygen taken up by aerobic micro-organisms as they metabolise the degradable organic material in the waste. The BOD level is accordingly related to the concentration of organic matter in the water. Usually the oxygen consumption is measured over a period of 5 days and is abbreviated to BOD5. BOD5 for municipal wastewater generally ranges from 80 to 250 mg oxygen per litre. Appropriate secondary treatment in sewage works decreases the BOD5 to less than 20 mg oxygen per litre. This is accomplished by lowering, through microbial oxidation the organic compound content of the effluent from the primary treatment. As a rough rule of thumb, COD (Chemical Oxygen Demand) levels will be one third higher than the BOD levels albeit the biodegradability (for example entrained fats and greases) of solids in the relevant effluent will have a significant impact upon the COD level.

The discharge of effluent, which contains high levels of organic contaminants and hence COD and SS levels, can result in significant financial costs being imposed in respect of trade effluent discharges. The Mogden formula (see below) is used for the purposes of calculating the appropriate charges.

Representative BOD Values for Sewage and Wastes from Agriculture and the Food Industry are as follows:

| Source | BOD (mg/litre)[a] |
|---|---|
| Domestic Sewage | 200-600 |
| Cattle shed & piggery effluents | 10,000-25,000 |
| Dairies | 500-2,000 |
| Whey from cheese making | 40,000-50,000 |
| Meat packing & processing | 100-3,000 |
| Fruit & vegetable canning | 200-5,000 |
| Sugar refining | 200-2,000 |
| Breweries | 500-2,000 |
| Distilleries | >5,000 |
| Palm oil processing | 15,000-25,000 |

[a]Milligrams of dissolved oxygen consumed per litre on incubation for 5 days at 20° C.

Additionally entrained food waste and other detritus disposed of to drainage systems which escape the grease traps or interceptors because of inadequately sized grease traps or interceptors or inadequate maintenance including regular scheduled pump outs can contribute to blockages in drainage systems and/or fouling of filtration systems or pumps within water treatment plants downstream of the drainage system.

For these reasons, depending on the country, it is often compulsory for commercial kitchen operations to fit some kind of interceptor device, typically referred to as a "grease trap" or interceptor. to collect the FOG plus the entrained food waste and detritus before it enters the sewer. Whilst FOGs have a specific gravity of <1 food wastes and other detritus have a specific gravity >than 1. Thus FOGs tend to gravitate towards the surface of the effluent and entrained food waste and detritus sink to the bottom.

Effluent conditions created in such grease traps or interceptors are acidic and consequently have an adverse affect upon concrete interceptors and the drainage infrastructure requiring costly relining and/or deterioration of the drainage network.

It is known to provide strainers in or downstream of the sink drain to collect and remove food waste and other solid material from waste water. It is known to locate strainers in the sink drain hole itself. However, such small strainers rapidly become clogged or are removed by operatives. It is also known to provide a larger capacity strainer device downstream of the sink drain, having a greater capacity than simple sink drain hole strainers. These are typically and invariably constructed of a wire mesh at the base with solid sides which in practice rapidly block up causing effluent to overflow and presenting operation problems in busy kitchens. Additionally the volume of incoming effluent can overwhelm the filtration means. However, even such larger capacity strainer devices require frequent emptying of collected solids. A further problem presents in what is known as a surface water tension phenomenon occurs leading again to non filtration and overflowing. Of effluent. Typically such strainer devices incorporate a removable basket or tray through which the waste water flows and within which the solid material is collected. The basket or tray is typically removable to facilitate the removal of collected solids therefrom. However, the removal of such basket or tray from the device to permit removal of collected solids therefrom can be a messy and difficult task, typically leading to the spillage of greasy waste water on the floor of a busy kitchen to present safety hazards.

SUMMARY OF THE INVENTION

The present invention provides an improved solid waste interceptor for collecting and removing solid waste from waste water and facilitates removal of collected solid waste without spillage of waste water. The waste interceptor may be used, for example, to prevent food waste and other detritus being discharged to the drainage system during periods when the main filtration system or device is being removed for emptying and cleaning. The waste interceptor may also be used to combat anaerobic conditions developing in grease traps or interceptors, by preventing food wastes and other detritus from entering such traps or interceptors. Use of the waste interceptor may also significantly reduce the BOD, COD and SS levels, with beneficial impacts upon the drainage infrastructure and the loading on waste water treatment works. The waste interceptor may advantageously be used to improve filtration and grease entrapment in food service establishments that lack the space or ability to install external passive traps or interceptors.

Moreover, the waste interceptor may accommodate higher flows than would be typical from one or more sink units, such as by intercepting floor drain into which effluent is directed from kitchen appliances such as tilting kettles, dishwashers, 20 grid ovens, wok cookers, potato peelers or rumblers, etc., for example. Such floor drains are invariably equipped with a filtration device, but it is removed by operators who dispose of all solids to the floor drains and thence to the external passive traps or interceptors, resulting in problems down stream.

In one form of the present invention there is provided a solid waste interceptor for a drain including a tank for collecting waste water therein, the tank having a waste water inlet and a waste water outlet, a solid waste collection tray housing a strainer basket being slidably mounted within the tank, in the manner of a drawer, to be moved between a closed position, wherein the strainer basket receives waste water from the waste water inlet, and an open position, wherein the solid waste collection tray extends from the tank to provide access to the strainer basket to facilitate emptying of collected solid waste therefrom, the solid waste collection tray being provided with a drain outlet spigot extending from a lower wall thereof for delivering waste water passing through the strainer basket into a sump of the tank, the drain outlet spigot being adapted to abut a front wall of the tank when the tray is in its open position to delimit the open position of the tray.

Optionally, the strainer basket incorporates apertures or slots, such that waste water from the waste water inlet of the tank can pass into the tray and through the strainer basket, while solid waste entrained within the waste water is collected within the strainer basket.

The sump of the tank may include an elongate gulley at its lowest point and remains within the tank to deliver waste water into the sump of the tank when the tray is in both its open and closed positions.

The gulley may extend substantially parallel to the direction of motion of the solid waste collection tray between its open and closed positions, and wherein the drain outlet spigot of the solid collection tray extends into the gulley when the tray is in both its open and closed positions. The waste water outlet of the tank may be provided at one end of the gulley at or adjacent a rear side of the tank. The gulley may slope downwardly towards the waste water outlet.

The gulley may be defined in or by a lower wall of the tank. Optionally, the lower wall of the tank slopes downwardly towards the gulley on either side of the gulley.

The solid waste collection tray may extend from a front side of the tank when in its open position. A front wall of the solid waste collection tray may define at least a portion of a front wall of the tank when the tray is in its closed position.

Optionally, the strainer basket is removably mounted in the solid waste collection tray.

In one embodiment a waste water distribution manifold may be mounted within an upper region of the tank, communicating with the waste water inlet of the tank, the manifold having a plurality of laterally spaced outlets for distributing waste water evenly across the width of the strainer basket when the tray is in its closed position. The waste water distribution manifold may be adapted to limit the flow rate of waste water entering the tank.

These and other objects, advantages and features of the invention will become apparent upon review of the following specification in conjunction with the drawings.

BRIEF DESCRIPTION OF THE DRAWINGS

A solid waste interceptor in accordance with embodiments of the present invention will now be described, by way of example only, with reference to the accompanying drawings, in which.

DETAILED DESCRIPTION OF THE DRAWINGS

Figure 1:
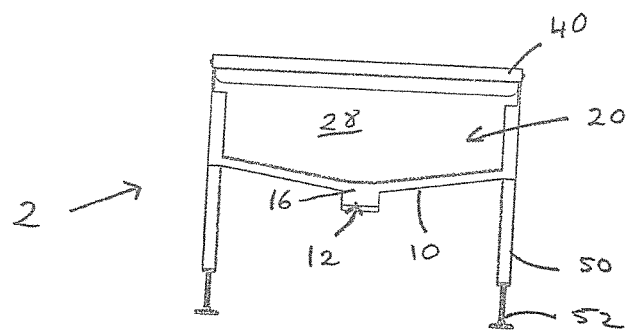
FIG. 1 is a front view of a solid waste interceptor in accordance with a first embodiment of the present invention.
Figure 2:
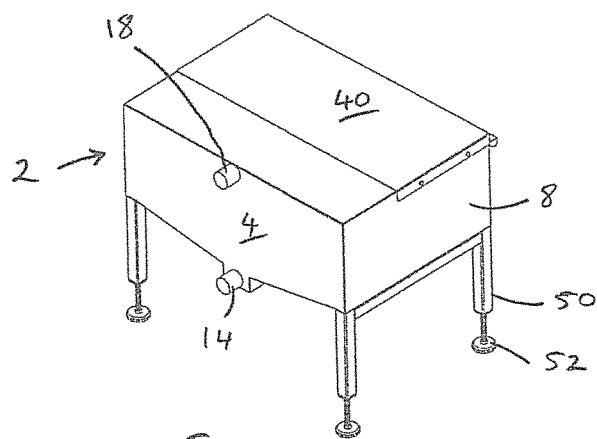
FIG. 2 is a perspective view of the solid waste interceptor of FIG. 1 from the rear.
Figure 3:
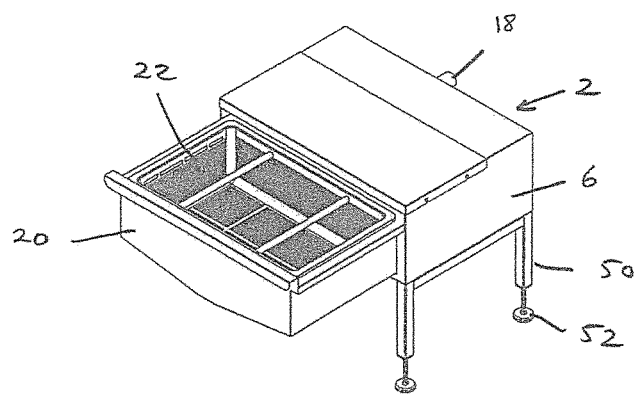
FIG. 3 is a perspective view of the solid waste interceptor of FIG. 1 with the food waste collection tray in an open position.
Figure 4:
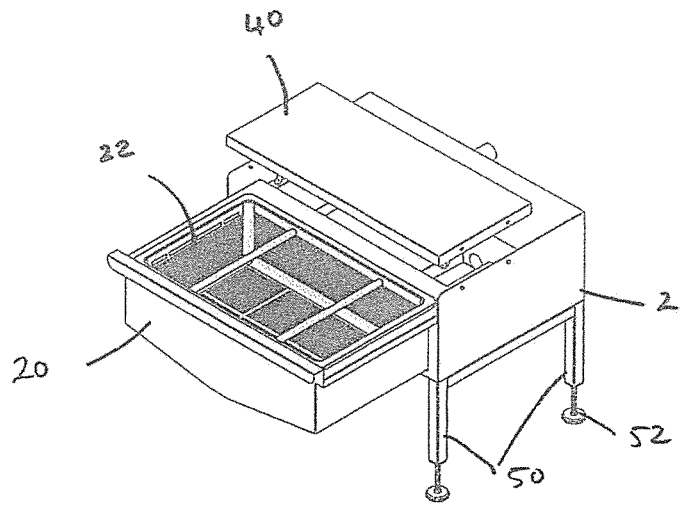
FIG. 4 is an exploded view of the solid waste interceptor of FIG. 1.
Figure 5:
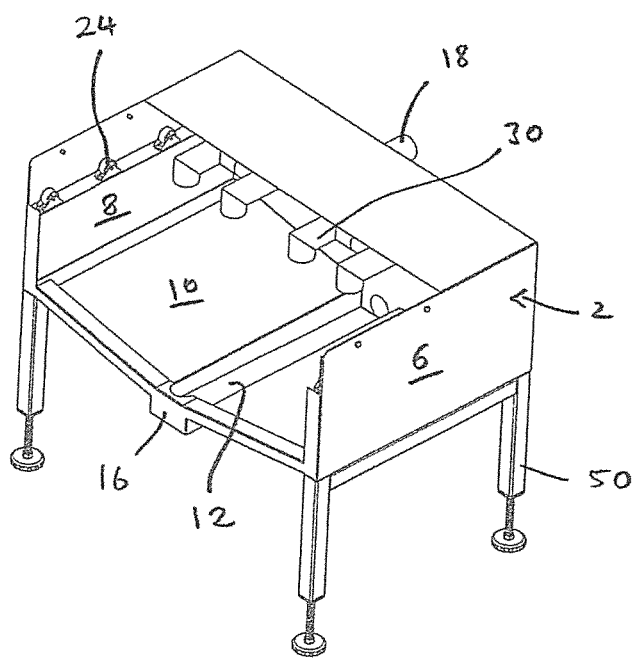
FIG. 5 is a perspective view of the solid waste interceptor of FIG. 1 with the food waste collection tray and top panel removed.
Figure 6:
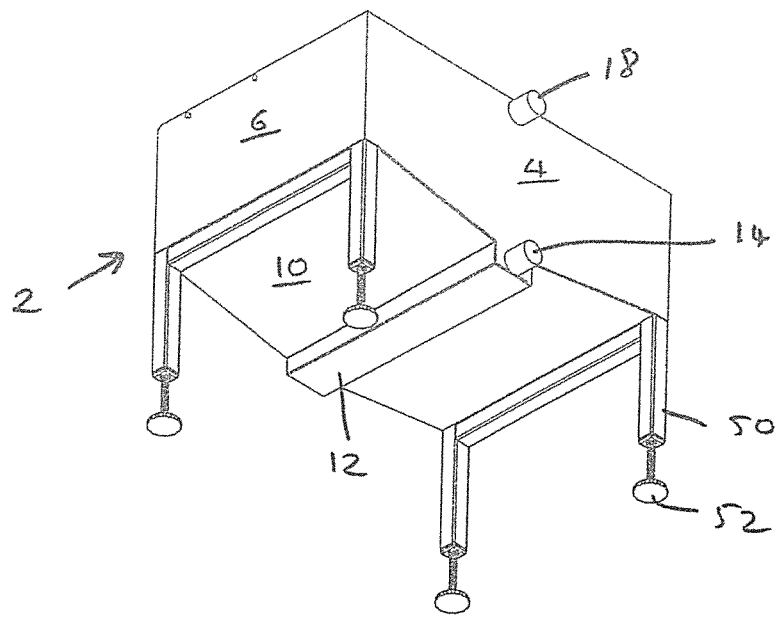
FIG. 6 is a perspective view of the tank of the solid waste interceptor of FIG. 1 from below.
Figure 7:
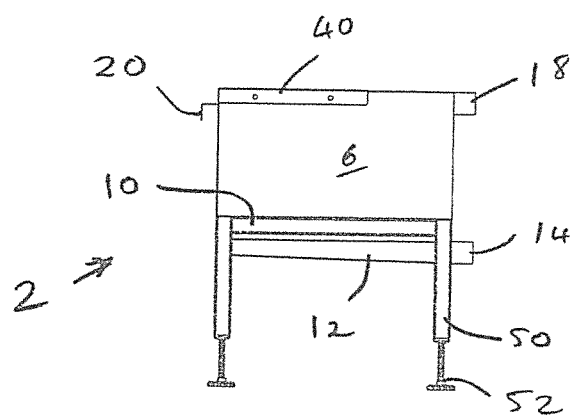
FIG. 7 is a side view of the tank of FIG. 6.
Figure 8:
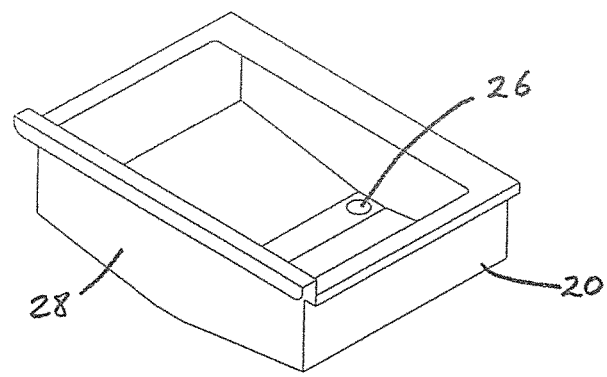
FIG. 8 is a perspective view of the food waste collection tray of the solid waste interceptor of FIG. 1.
Figure 9:
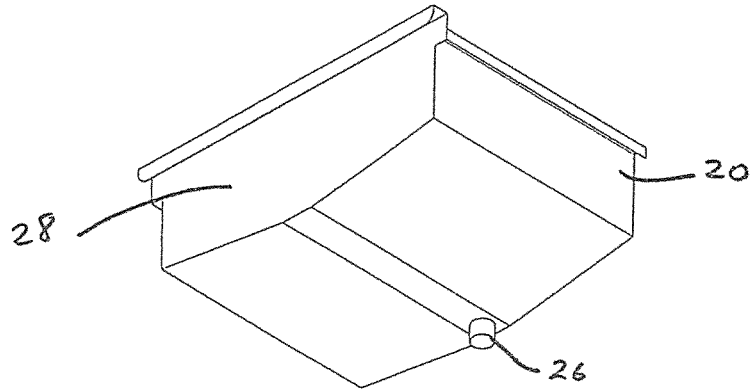
FIG. 9 is a perspective view of the food waste collection tray of the solid waste interceptor of FIG. 1 from below.
Figure 10:
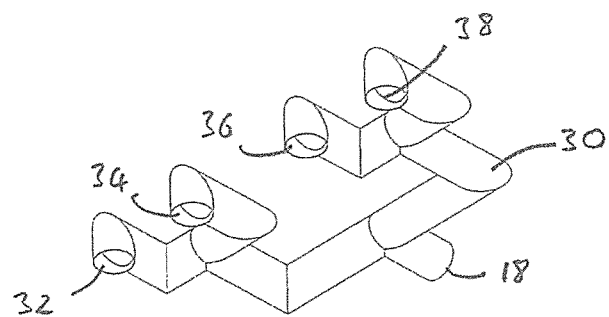
FIG. 10 is a perspective view of the waste water inlet manifold of the solid waste interceptor of FIG. 1.
Figure 11:
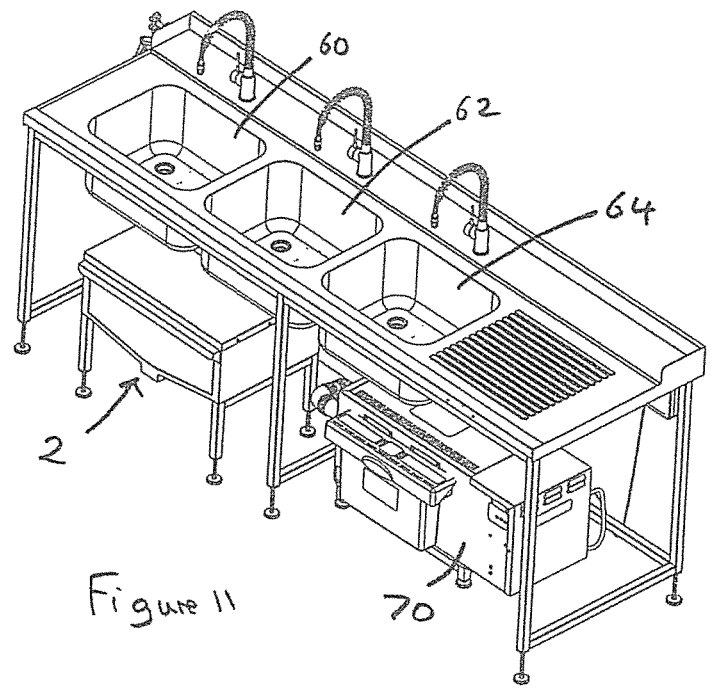
FIGS. 11 and 12 are perspective views illustrating the solid waste interceptor of FIG. 1 in use with a grease trap.
Figure 12:
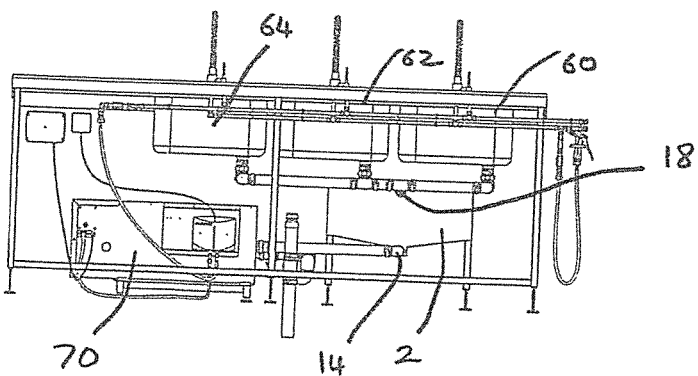

A solid waste interceptor for a drain of a kitchen sink in accordance with a first embodiment of the present invention as illustrated in FIGS. 1 to 12, includes a substantially rectangular tank 2 adapted to be located beneath a sink in a commercial or domestic kitchen (as shown in FIGS. 11 and 12), the tank 2 having a rear wall 4, side walls 6,8 and a base wall 10 and defining a sump for collecting waste water therein, the sump incorporating a central gulley 12 at the lowermost point of the base wall 10, extending parallel to the the side walls 6,8 of the tank 2 and terminating in a drain outlet 14 at a rear of the tank 2, the base wall 10 preferably depending downwardly on either side of the gulley 12 to facilitate the drainage of waste water into the gully 12.

The drain outlet 14 is provided at one end of the gulley 12, extending from the rear wall 4 of the tank 2. Preferably the gulley 12 slopes downwardly towards the drain outlet 14, sloping downwardly from the front to the rear of the tank 2. A raised lip 16 is provided at a front side of the tank 2 to prevent waste water from leaking out of the tank 2, the lip 16 preferably defining an outer or front wall of the gulley 12.

A food waste collection tray 20 is located within the tank 2, a strainer basket 22 being mounted within the tray 20 for collecting food waste and other solid waste therein. The tank 2 is provided with a waste water inlet 18 adapted to deliver waste water, which may contain food waste and other solid material, into the strainer basket 22 of the tray 20.

The food waste collection tray 20 is slidably mounted within the tank 2 in the manner of a drawer, the tray 20 being adapted to be slid laterally into and out of a front side of the tank 2 between a closed position, wherein the strainer basket 22 receives waste water from the waste water inlet 18, and an open position, wherein the tray 20 extends laterally from the front of the tank 2 to provide access to the strainer basket 22 to permit removal of the strainer basket 22 for emptying collected food waste therefrom. Runners 24 (FIG. 5) may be provided on the inner faces of the side walls 6,8 of the tank 2 upon which the tray 20 may be supported and guided. The front wall 28 of the tray 20 defines a portion of the front wall of the tank 2 when the tray 20 is in its closed position.

A drain outlet 26 is provided in the base of the food waste collection tray 20 adjacent a rear wall thereof for delivering waste water into the sump of the tank 2, in particular into the gulley 12 thereof. The drain outlet 26 of the tray 20 is adapted to remain within the tank 2 when the tray 20 is in both its open and closed positions so that waste water cannot leak from the tray 20 when the tray 20 is moved to its open position for removal and cleaning of the strainer basket 22. The drain outlet 26 of the tray includes a spigot depending downwardly from the bottom of the tray 20 to be located within the gulley 12 of the tank 2, in use, such that the spigot traverses the gulley 12 during movement of the tray 20 between its open and closed positions. Abutment of the drain outlet spigot 26 with a front or upper end of the gulley 12 delimits the open position of the tray 20.

A waste water distribution manifold 30 may be mounted within an upper region of the tank 2, communicating with the waste water inlet 18 at the rear wall 4 of the tank 2, the manifold 30 having a plurality of laterally spaced outlets 32,34,36,38 for distributing waste water evenly across the width of the strainer basket 22 when the tray 20 is in its closed position. The waste water distribution manifold also serves to limit the maximum flow rate of waste water into the tank, avoiding excessive flow rates of waste water into the tank which could otherwise overwhelm the capacity of the tank.

At least a front region 40 of an upper wall of the tank may be removable to define an access panel providing access to the distribution manifold 30 for cleaning and servicing thereof.

The tank 2 may be mounted on support legs 50. The support legs 50 may be adjustable in length or be provided with adjustable feet 52 to allow the height and/or level of the tank 2 to be adjusted.

The tank 2 and tray 20 may be formed from sheet metal, such as stainless steel, while the strainer basket 22 may be formed from moulded plastic.

FIGS. 11 and 12 illustrate one possible use of the tank 2, showing the tank 2 located beneath a row of sinks 60,62,64, the drains of the sinks 60,62,64 being coupled to the waste water inlet 18 of the tank 2. The drain outlet 14 of the tank is connected to the inlet of a grease trap 70. In use, food waste and other solid material passing into the drains of the sinks 60,62,64 flows into the food waste collection tray 20 within the tank 2 and is trapped in the strainer basket 22 therein, while waste water passes through the basket 22, into the tray 20, through the drain outlet spigot 26 of the tray 20, into the gulley 12 of the tank 2 and out of the drain outlet 14 of the tank to pass into the grease trap, wherein FOG is removed from the waste water. Periodically the tray 20 can be pulled out of the tank 2 to its open position and the strainer basket 22 can be inspected and emptied if required without the risk of spillage of waste water from the tray 20.

Figure 13:
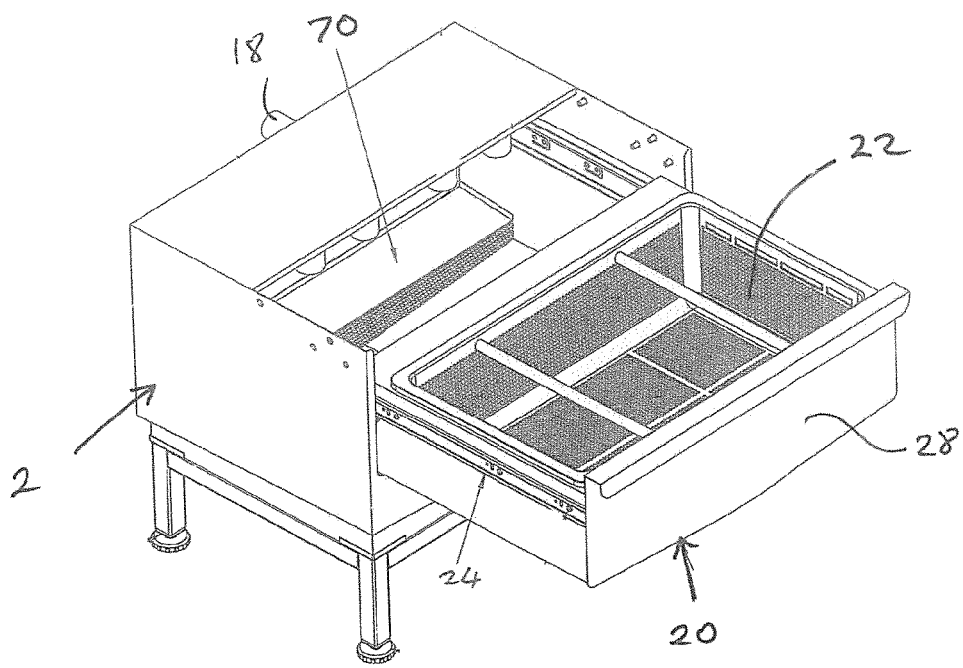
FIG. 13 is a perspective view of a solid waste interceptor in accordance with a second embodiment of the present invention.
Figure 14:
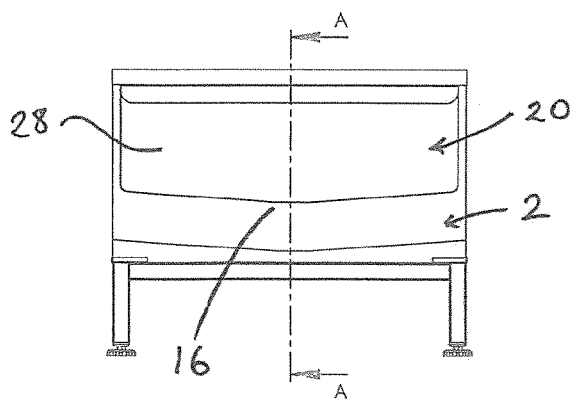
FIG. 14 is a front view of the solid waste interceptor of FIG. 13.
Figure 15:
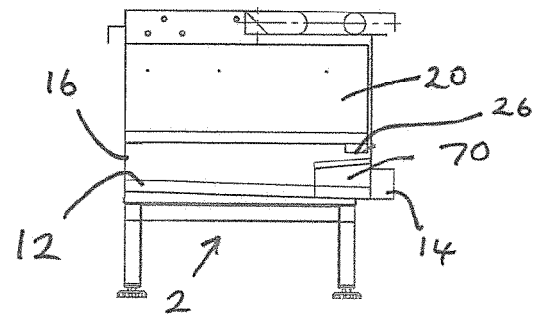
FIG. 15 is a sectional view of the solid waste interceptor of FIG. 13 on line A-A of FIG. 14.
Figure 16:
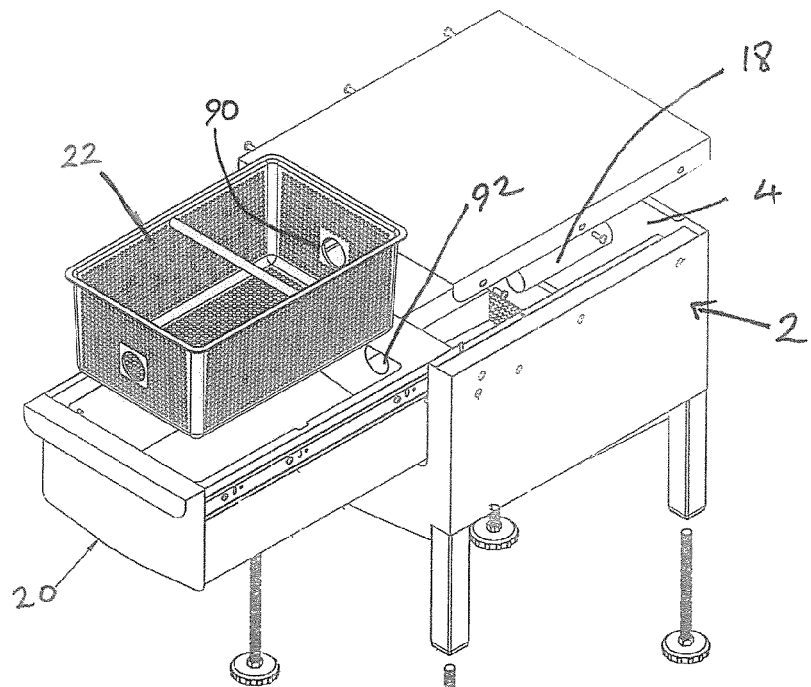
FIG. 16 is a perspective view of a solid waste interceptor in accordance with a further embodiment of the present invention.
Figure 18:
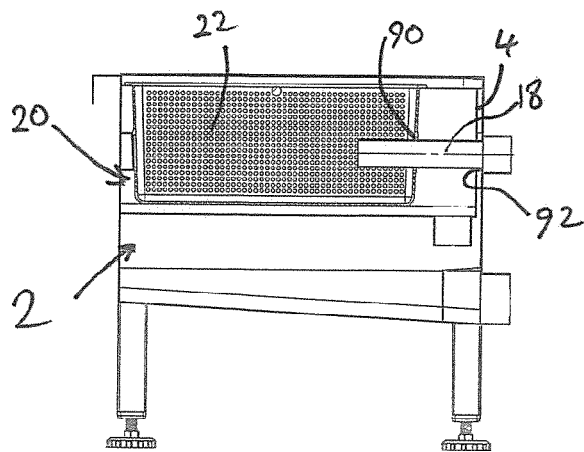
FIG. 18 is a sectional view of the solid waste interceptor of FIG. 16 on line A-A of FIG. 17.
Figure 17:
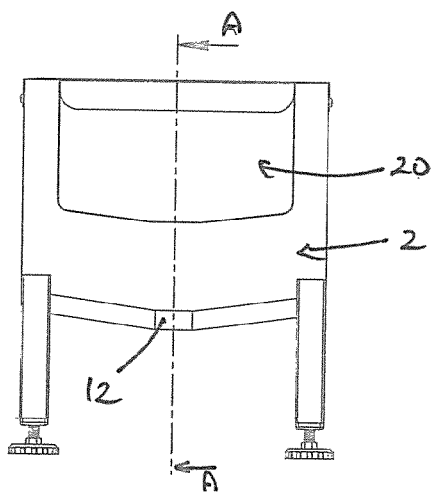
FIG. 17 is a front view of the solid waste interceptor of FIG. 16.

A solid waste interceptor in accordance with a second embodiment of the present invention is illustrated in FIGS. 13 to 15, where like reference numerals are used for like features.

The solid waste interceptor in accordance with the second embodiment of the present invention again includes a tank 2 housing a food waste collection tray 20 within which is mounted a removable strainer basket 22, the tray 20 being slidably mounted within the tank 2 on runners 24 in the manner of a drawer, such that the tray 20 can be slid laterally into and out of a front side of the tank 2 between a closed position, wherein the strainer basket 22 receives waste water from a waste water inlet 18, and an open position, wherein the tray 20 extends laterally from the front of the tank 2 to provide access to the strainer basket 22 to permit removal of the strainer basket 22 for emptying collected food waste therefrom. The front wall 28 of the tray 20 defines a portion of the front wall of the tank 2 when the tray 20 is in its closed position.

The solid waste interceptor in accordance with the second embodiment of the present invention differs from that of the first embodiment in that the sump of the tank 2 is deeper than that of the tank of the first embodiment such that the gulley 12 is defined by the entire base wall 10 of the tank 2. The front wall of the tank 2, defining the raised lip 16 of the tank 2 is higher than that of the first embodiment. The increased volume of the sump of the tank 2 reduces any risk of leakage from the tank via the front side of the tank 2.

As with the solid waste interceptor of the first embodiment, a drain outlet 26 is provided in the base of the food waste collection tray 20 adjacent a rear wall thereof for delivering waste water into the sump of the tank 2. The drain outlet 26 of the tray 20 is adapted to remain within the tank 2 when the tray 20 is in both its open and closed positions so that waste water cannot leak from the tray 20 when the tray 20 is moved to its open position for removal and cleaning of the strainer basket 22. The drain outlet 26 of the tray includes a spigot depending downwardly from the bottom of the tray 20 to be located within the sump 12 of the tank 2, in use, such that the spigot traverses the base wall 10 during movement of the tray 20 between its open and closed positions. Abutment of the drain outlet spigot 26 with the raised lip 16 defined by the front wall of the tank 2 delimits the open position of the tray 20 and prevents the tray 20 from being pulled completely out of the tank 2.

A further strainer unit 80 may be located adjacent the rear wall 4 of the tank between the sump of the tank 2 and the drain outlet 14 to provide a further barrier to the passage of solid waste material into the drain outlet 14.

A solid waste interceptor in accordance with a third embodiment of the present invention is illustrated in FIGS.

16 to 18, where like reference numerals are used for like features. The solid waste interceptor in accordance with the third embodiment of the present invention has a smaller capacity than that of the first and second embodiments. The main difference between the solid waste interceptor of the third embodiment and those of the first and second embodiments is in respect of the waste water inlet 18. In the third embodiment the water distribution manifold of the first and second embodiments is omitted, due to the smaller size of the tank 2. Instead the waste water inlet extends horizontally through the rear wall 4 of the tank and through aligned holes 90,92 in the rear walls of the tray 20 and strainer basket 22 to extend into the strainer basket 22 when the tray 20 is in its closed position within the tank 2. As with the second embodiment, the gulley 12 is defined by the entire base wall 10 of the tank 2.

While solid waste interceptors in accordance with embodiments of the present invention have been described for use when installed between the drain of one or more sinks and the inlet of a grease trap it is envisaged that they could be utilised in numerous other applications where it is desired to intercept solid material from a waste water or other liquid stream, for example in coffee machine filtration, small pre rinse and preparation sinks, under counter dishwashers, commercial pot wash sinks, hood dishwashers, large preparation sinks and floor drains etc. For example, a pump may be provided for pumping waste water or effluent into the tank. The waste water inlet manifold may serve to limit the flow rate of waste water or effluent supplied by such pump. In one embodiment such a pump may be used to deliver waste water into the tank from a floor drain. The size and volume of the tank 2 and tray 22 may be selected to suit the particular application. In the case of smaller tanks the waste water inlet manifold may not be required. In such cases, an alternative flow control device, such as a vortex flow controller, may be used to limit the maximum flow rate of waste water entering the tank.

The invention is not limited to the embodiment(s) described herein but can be amended or modified without departing from the scope of the present invention, which is intended to be limited only by the scope of the appended claims as interpreted according to the principles of patent law including the doctrine of equivalents.

The invention claimed is:

1. A solid waste interceptor for a drain comprising:
    a tank for collecting waste water therein, the tank having a waste water inlet and a waste water outlet;
    a solid waste collection tray housing a strainer basket being slidably mounted within the tank, in the manner of a drawer, to be moved between a closed position in which the strainer basket receives waste water from the waste water inlet, and an open position in which the solid waste collection tray extends from the tank to provide access to the strainer basket to facilitate emptying of collected solid waste therefrom; and
    a drain outlet spigot extending from a lower wall of the solid waste collection tray for delivering waste water passing through the strainer basket into a sump of the tank, the drain outlet spigot being adapted to abut a front wall of the tank when the tray is in its open position to delimit the open position of the tray;
    wherein the sump of the tank includes an elongate gulley that extends substantially parallel to the direction of motion of the solid waste collection tray between its open and closed positions, and wherein the drain outlet spigot of the solid collection tray extends into the gulley when the tray is in both its open and closed positions.

2. The solid waste interceptor of claim 1, wherein the strainer basket incorporates apertures or slots, such that waste water from the waste water inlet of the tank can pass into the tray and through the strainer basket, while solid waste entrained within the waste water is collected within the strainer basket.

3. The solid waste interceptor of claim 1, wherein the elongate gulley is at the lowest point of the sump and the elongate gulley remains within the tank to deliver waste water into the sump of the tank when the tray is in both its open and closed positions.

4. The solid waste interceptor of claim 1, wherein the waste water outlet of the tank is provided at one end of the gulley at or adjacent a rear side of the tank.

5. The solid waste interceptor of claim 1, wherein the gulley slopes downwardly towards the waste water outlet.

6. The solid waste interceptor of claim 1, wherein the gulley is defined in or by a lower wall of the tank.

7. The solid waste interceptor of claim 6, wherein the lower wall of the tank slopes downwardly towards the gulley on either side of the gulley.

8. The solid waste interceptor of claim 1, wherein the solid waste collection tray extends from a front side of the tank when in its open position.

9. The solid waste interceptor of claim 8, wherein a front wall of the solid waste collection tray defines at least a portion of a front wall of the tank when the tray is in its closed position.

10. The solid waste interceptor of claim 1, wherein the strainer basket is removably mounted in the solid waste collection tray.

11. The solid waste interceptor of claim 1, further comprising a waste water distribution manifold mounted within an upper region of the tank, communicating with the waste water inlet of the tank, the manifold having a plurality of laterally spaced outlets for distributing waste water evenly across the width of the strainer basket when the tray is in its closed position.

12. The solid waste interceptor of claim 11, wherein the waste water distribution manifold is adapted to limit the flow rate of waste water entering the tank.

* * * * *